July 11, 1939.  E. L. SCHOLL  2,165,818
METHOD OF BONDING RESILIENT RUBBER
Filed May 4, 1937
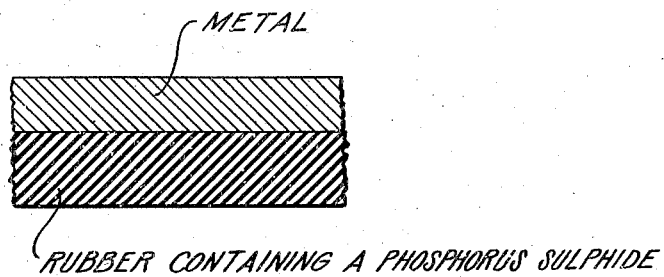
INVENTOR.
ELWOOD L. SCHOLL
BY
ATTORNEY.

Patented July 11, 1939

2,165,818

UNITED STATES PATENT OFFICE 2,165,818

METHOD OF BONDING RESILIENT RUBBER

Elwood L. Scholl, Detroit, Mich., assignor, by mesne assignments, to United States Rubber Company, New York, N. Y., a corporation of New Jersey Application May 4, 1937, Serial No. 140,674

8 Claims. (Cl. 154—2).

This invention relates to a method of bonding rubber to metal, and in particular it relates to treatment of a rubber composition whereby to render it capable of being bonded directly to a ferrous metal with vulcanization of the rubber. In general, the invention contemplates the formation of a bond between rubber and a ferrous metal comprising the steps of mixing a sulphide of phosphorus with a vulcanizable solid rubber composition, applying the resultant composition to a metal having a ferrous base, and applying heat to the rubber to effect its vulcanization.

In the industry it has been general practice to bond rubber to a ferrous metal by first coating or plating the metal with a brass or bronze alloy. While in general this method has been satisfactory, it has many disadvantages. For example, in production methods of bonding rubber to metal considerable expense is involved in the installation and maintenance of tanks and equipment for pickling, plating, and washing metal parts. Furthermore, production methods are not suitable for plating metal where the parts are of various shapes and sizes.

In accordance with the practice of my invention, it is necessary only that the metal be relatively free from grease or other impurities. It is, therefore, an object of my invention to provide an economical and efficient method of bonding rubber to metals generally. Another object is to provide a method of bonding rubber to a ferrous metal by direct application of rubber to the metal. A still further object is to accomplish the foregoing objects while maintaining a degree of adhesion between the rubber and metal which is at least equal to the degree of adhesion ordinarily obtained between rubber and bronze or brass plated ferrous metal.

In the practice of my invention a rubber composition may be treated by mixing therein a small quantity of sulfide of phosphorus such as phosphorus trisulfide or phosphorus pentasulfide. The sulfide of phosphorus in powdered form is mixed directly with the solid rubber composition without requiring any particular change in the materials ordinarily added to the rubber when manufacturing a durable rubber composition.

The following, in which the parts are by weight, is an example of the rubber composition incorporating a sulfide of phosphorus and resulting in a high degree of adhesion when vulcanized directly to a ferrous metal:

| | |
|---|---|
| Rubber | 100 |
| Zinc oxide | 3 |
| Phosphorus trisulfide | 1.25 |
| Calcium hydroxide | 10 |
| Carbon black | 45 |
| Stearic acid | 1 |
| Phenyl beta naphthylamine | 1 |
| Organic accelerator | 1 |
| Sulfur | 3.25 |

In mixing a composition of this kind I find it preferable to prepare the rubber composition on the mill in the usual manner, and to add the sulfide of phosphorus in the last step of the mixing operation. I have found from various experiments that a reduction in the percent of sulfide of phosphorus results in a corresponding reduction in the degree of adhesion of the rubber to the metal. I have also found that an increase in the quantity of the sulfide of phosphorus does not substantially increase the degree of adhesion.

As a substitute for phosphorus trisulfide it has been found that phosphorus pentasulfide may be used in the same proportions and with substantially the same result.

I have found that the sulfide of phosphorus reacts directly with the rubber in effecting adhesion with a ferrous metal. Adhesion has been obtained after adding sulfide of phosphorus directly to the rubber, by the application of heat, although no substantial vulcanization of the rubber took place. Preferably the assembled product is subjected to pressure and heat sufficient to vulcanize the rubber as desired. The general assembly is shown by the figure in the drawing.

In preparing ferrous metal for the application of the rubber composition it is merely necessary that the metal be free from grease or other impurities. An example of a commercial method of cleaning metal prior to the application of rubber is the conventional pickling process.

The sulphide of phosphorus may be mixed with the entire volume of the rubber to be applied to the metal or it may be contained in a thin sheet or layer of the rubber composition and this sheet applied either to the rubber surface or to the metal surface as an interfacial layer. In such case, the interfacial layer provides a medium having a high degree of adhesion property with both the metal and the rubber.

In the conventional method of adhering rubber to a brass or bronze plated ferrous metal the degree of adhesion between the rubber was on the order of a tensile pull at the separation point of about 500 pounds per square inch. By using a sulfide of phosphorus in a rubber composition as hereinbefore described, and applying the composition directly to a metal having a ferrous base, I find that the degree of adhesion between rubber and metal is also on the order of about 500 pounds per square inch.

The term rubber is to be construed broadly as including caoutchouc, balata, gutta percha, and similar materials including synthetic or artificial rubber-like materials, e. g. polychloroprene (Neoprene) which are capable of being cured to an elastic state after incorporation of suitable vulcanizing ingredients.

Having thus described my invention, what I claim and desire to protect by Letters Patent is:

1. A method of bonding rubber to ferrous metal which comprises incorporating a small amount of a sulphide of phosphorus into a vulcanizable solid rubber composition, applying said rubber composition directly to the metal, and uniting the rubber to the metal by application of heat sufficient to at least partially vulcanize the rubber.

2. A method of bonding rubber to ferrous metal which comprises incorporating a small amount of a sulphide of phosphorus into a vulcanizable solid rubber composition, applying said vulcanizable rubber composition as an interfacial layer between the metal and another vulcanizable rubber composition, and uniting the entire rubber mass together and to the metal by the application of heat sufficient to at least partially vulcanize the rubber.

3. A method of bonding rubber to ferrous metal which comprises incorporating a small amount of phosphorus trisulphide into a vulcanizable solid rubber composition, applying said rubber composition directly to the metal, and uniting the rubber to the metal by application of heat sufficient to at least partially vulcanize the rubber.

4. A method of bonding rubber to ferrous metal which comprises incorporating a small amount of phosphorus trisulphide into a vulcanizable solid rubber composition, applying said vulcanizable rubber composition as an interfacial layer between the metal and another vulcanizable rubber composition, and uniting the entire rubber mass together and to the metal by the application of heat sufficient to at least partially vulcanize the rubber.

5. A method of bonding rubber to ferrous metal which comprises incorporating a small amount of phosphorus pentasulphide into a vulcanizable solid rubber composition, applying said rubber composition directly to the metal, and uniting the rubber to the metal by application of heat sufficient to at least partially vulcanize the rubber.

6. A method of bonding rubber to ferrous metal which comprises incorporating a small amount of phosphorus pentasulphide into a vulcanizable solid rubber composition, applying said vulcanizable rubber composition as an interfacial layer between the metal and another vulcanizable rubber composition, and uniting the entire rubber mass together and to the metal by the application of heat sufficient to at least partially vulcanize the rubber.

7. A method of bonding rubber to ferrous metal which comprises applying directly to the metal surface a layer of vulcanizable solid rubber composition containing a small proportion by weight based on the rubber of a sulphide of phosphorus, and uniting by means of heat the rubber and the metal with vulcanization of the rubber.

8. A method of bonding rubber to ferrous metal which comprises applying directly to the metal surface a layer of vulcanizable solid rubber composition containing about 1.25 parts by weight based on the rubber of a sulphide of phosphorus, and uniting by means of heat the rubber and the metal with vulcanization of the rubber.

ELWOOD L. SCHOLL.